(12) United States Patent
Chen

(10) Patent No.: US 8,836,167 B2
(45) Date of Patent: Sep. 16, 2014

(54) POWER REDUNDANT SYSTEM

(75) Inventor: Chia-Hsiang Chen, Taipei (TW)

(73) Assignee: Inventec Corporation, Taipei (TW)

( * ) Notice: Subject to any disclaimer, the term of this patent is extended or adjusted under 35 U.S.C. 154(b) by 505 days.

(21) Appl. No.: 13/337,777

(22) Filed: Dec. 27, 2011

(65) Prior Publication Data

US 2013/0127250 A1    May 23, 2013

(30) Foreign Application Priority Data

Nov. 18, 2011    (TW) .............................. 100142257 A

(51) Int. Cl.
*H02J 3/00* (2006.01)
*G06F 1/30* (2006.01)
*H02J 9/06* (2006.01)

(52) U.S. Cl.
CPC .. *H02J 9/061* (2013.01); *G06F 1/30* (2013.01)
USPC ............................................ 307/80; 307/81

(58) Field of Classification Search
CPC ................ H02J 1/10; H02J 9/061; G06F 1/26
USPC .................. 307/80, 66, 64; 713/300
See application file for complete search history.

(56) References Cited

U.S. PATENT DOCUMENTS

| | | | |
|---|---|---|---|
| 6,987,333 B2 * | 1/2006 | Winick et al. | 307/85 |
| 2005/0008146 A1 * | 1/2005 | Chheda et al. | 379/413 |
| 2010/0332857 A1 * | 12/2010 | Vogman | 713/300 |

* cited by examiner

*Primary Examiner* — Jared Fureman
*Assistant Examiner* — Morsheda Khatun
(74) *Attorney, Agent, or Firm* — CKC & Partners Co., Ltd.

(57) ABSTRACT

A power redundant system is provided. The power redundant system includes N first voltage generators, M second voltage generators, a switch unit and a control unit. A voltage of the i-th first voltage generator and a voltage of the j-th second voltage generator are equal. When a power good signal is enabled, the control unit enables a power control signal to control the switch unit so that an output of the switch unit is connected to an output of the j-th second voltage generator. When a power supply signal is enabled and the power good signal is disabled, the control unit disables the power control signal to control the switch unit so that the output of the switch unit is connected to an output of the i-th first voltage generator. Therefore, the first voltage generator and the second voltage generator of the system can backup each other.

18 Claims, 4 Drawing Sheets

POWER REDUNDANT SYSTEM

CROSS-REFERENCE TO RELATED APPLICATION

This application claims the priority benefit of Taiwan application serial no. 100142257, filed Nov. 18, 2011. The entirety of the above-mentioned patent application is hereby incorporated by reference herein and made a part of this specification.

BACKGROUND OF THE INVENTION

1. Field of the Invention

The present invention generally relates to a power supply technology, and in particular, to a power redundant system including a plurality of voltage generators.

2. Description of Related Art

In the current era of advanced technology, a computer system has unavoidably become an indispensable information processing tool in people's life. However, a good power supply scheme contributes to operation of the computer system.

When the computer system is not booted up, a part of elements must be started in advance to enable the system to enter a standby state, so that when a power signal for formal start-up is enabled, the system can gradually wake up all devices according to a set scheme, so as to perform a complete start-up procedure, until the system completes entering a run time state. FIG. 1 is a schematic block diagram of a conventional computer power supply system 100. Referring to FIG. 1, according to a power sequence of the system, a power supply unit (PSU) 110 provides a 12 V power to a first voltage generator 120 to start up an auxiliary power (AUX Power), and a 5 V first voltage generator 120_1 to a 1.1 V first voltage generator 120_5 are gradually started up in turn. When the AUX power is started up completely, the system enters a standby state. Only after the system is stared up, a main power (MAIN Power) enabling signal (MAIN SEN) is transmitted to the PSU 110. At this time, the main power is formally started up, and a 6.5 V second voltage generator 130_1 (a driving transistor) to a 1.1 V second voltage generator 130_5 are gradually started up according to the power sequence.

If any one of the voltage generators in the computer power supply system is faulty so that a certain supplied voltage is faulty, and the faulty voltage generator in the system cannot be locally reset alone, the system breaks down. At this time, the whole system must be rebooted up to recover. Therefore, how to develop a power redundant system expected to be capable of providing a redundant power in a power supply system including a plurality of voltage generators and further enable the voltage generators to backup each other is a problem to be solved.

SUMMARY OF THE INVENTION

Accordingly, the present invention is directed to a power redundant system, where through a control unit and a switch unit, in a power supply system including a plurality of voltage generators, the voltage generators of the system can backup each other.

The present invention provides a power redundant system, including N first voltage generators, M second voltage generators, a switch unit, and a control unit. The N first voltage generators provide N different voltages. The M second voltage generators provide M different voltages, where a voltage of the i-th first voltage generator is the same as that of the j-th second voltage generator, the j-th second voltage generator operates and supplies the voltage when the j-th second voltage generator receives a power enable signal, the j-th second voltage generator outputs a power good signal when supplying the voltage normally, N and M are positive integers greater than 1, i is a natural number and is less than or equal to N, and j is a natural number and is less than or equal to M. The switch unit coupled to the i-th first voltage generator and the j-th second voltage generator receives the power control signal, to select one of two outputs of the i-th first voltage generator and the j-th second voltage generator to be connected to an output of the switch unit. The control unit is coupled to the switch unit and the j-th second voltage generator, and the control unit generates a power enable signal according to a power supply signal. When the power good signal is enabled, the control unit enables the power control signal to control the switch unit so that the output of the switch unit is connected to the output of the j-th second voltage generator. When the power supply signal is enabled and the power good signal is disabled, the control unit disables the power control signal to control the switch unit so that the output of the switch unit is connected to the output of the i-th first voltage generator.

The present invention provides a power redundant system, including N first voltage generators, M second voltage generators, L switch units, and L control units. The N first voltage generators provide N different voltages. The M second voltage generators provide M different voltages, where voltages of L first voltage generators are the same as those of L second voltage generators, a voltage of the i-th first voltage generator is the same as that of the j-th second voltage generator, a voltage of the (i+1)-th first voltage generator is the same as that of the (j+1)-th second voltage generator, . . . , and a voltage of the (i+L−1)-th first voltage generator is the same as that of the (j+L−1)-th second voltage generator; when each of the second voltage generators with the same voltage receives a power enable signal, the second voltage generators operate and supply the voltage; the second voltage generators each output a power good signal when supplying the voltage normally; N, M and L are positive integers greater than 1, i is a natural number and is less than or equal to N, j is a natural number and is less than or equal to M, and L is less than or equal to N and M. The first switch unit is coupled to the i-th first voltage generator and the j-th second voltage generator, the second switch unit is coupled to the (i+1)-th first voltage generator and the (j+1)-th second voltage generator, . . . , the L-th switch unit is coupled to the (i+L−1)-th first voltage generator and the (j+L−1)-th second voltage generator; each of the switch units is used for receiving a power control signal to select one of two outputs of the coupled first voltage generator and the coupled second voltage generator thereof to be connected to an output of each of the switch units respectively. The first control unit is coupled to the first switch unit and the j-th second voltage generator, the second control unit is coupled to the second switch unit and the (j+1)-th second voltage generator, . . . , the L-th control unit is coupled to the L-th switch unit and the (j+L−1)-th second voltage generator; each of the control units receives a power supply signal to generate the power enable signal according to the power supply signal; when the received power good signal is enabled, the control unit enables and outputs the power control signal respectively to control the switch unit so that the output of the switch unit is connected to the output of the second voltage generator connected to the switch unit; and when the received power supply signal is enabled and the power good signal is disabled, the control unit disables and outputs the power control signal respectively to control the switch unit so that the output of the switch unit is connected to the output of the first voltage generator connected to the switch unit.

The present invention provides a power redundant system, including N first voltage generators, M second voltage generators, L first switch units, L first control units, L second switch units, and L second control units. The N first voltage generators provide N different voltages. The M second voltage generators provide M different voltages, where voltages of L first voltage generators are the same as those of L second voltage generators, a voltage of the i-th first voltage generator is the same as that of the j-th second voltage generator, a voltage of the (i+1)-th first voltage generator is the same as that of the (j+1)-th second voltage generator, . . . , and a voltage of the (i+L−1)-th first voltage generator is the same as that of the (j+L−1)-th second voltage generator; when each of the first voltage generators with the same voltage receives a first power enable signal, the first voltage generators operate and supply the voltage; the first voltage generators each output a first power good signal when supplying the voltage normally; when each of the second voltage generators with the same voltage receives a second power enable signal, the second voltage generators operate and supply the voltage; the second voltage generators each output a second power good signal when supplying the voltage normally; N, M and L are positive integers greater than 1, i is a natural number and is less than or equal to N, j is a natural number and is less than or equal to M, and L is less than or equal to N and M. The 1-st first switch unit is coupled to the i-th first voltage generator and the j-th second voltage generator, the 2-nd first switch unit is coupled to the (i+1)-th first voltage generator and the (j+1)-th second voltage generator, . . . , the L-th first switch unit is coupled to the (i+L−1)-th first voltage generator and the (j+L−1)-th second voltage generator; each of the first switch units is used for receiving a power control signal to select one of two outputs of the coupled first voltage generator and the coupled second voltage generator thereof to be connected to an output of each of the first switch units respectively. The 1-st first control unit is coupled to the 1-st first switch unit and the i-th first voltage generator, the 2-nd first control unit is coupled to the 2-nd first switch unit and the (i+1)-th first voltage generator, . . . , the L-th first control unit is coupled to the L-th first switch unit and the (i+L−1)-th first voltage generator; each of the first control units receives a first power supply signal to generate the first power enable signal according to the first power supply signal; when the received first power good signal is enabled, the first control unit enables and outputs the first power control signal to control the first switch unit respectively so that the output of the first switch unit is connected to the output of the first voltage generator connected to the first switch unit; and when the received first power supply signal is enabled and the first power good signal is disabled, the first control unit disables and outputs the first power control signal respectively to control the first switch unit so that the output of the first switch unit is connected to the output of the second voltage generator connected to the first switch unit. The 1-st second switch unit is coupled to the i-th first voltage generator and the j-th second voltage generator, the 2-nd second switch unit is coupled to the (i+1)-th first voltage generator and the (j+1)-th second voltage generator, . . . , the L-th second switch unit is coupled to the (i+L−1)-th first voltage generator and the (j+L−1)-th second voltage generator; each of the second switch units is used for receiving a second power control signal to select one of two outputs of the coupled first voltage generator and the coupled second voltage generator thereof to be connected to an output of each of the second switch units respectively. The 1-st second control unit is coupled to the 1-st second switch unit and the j-th second voltage generator, the 2-nd second control unit is coupled to the 2-nd second switch unit and the (j+1)-th second voltage generator, . . . , the L-th second control unit is coupled to the L-th second switch unit and the (j+L−1)-th second voltage generator; each of the second control units receives a second power supply signal to generate the second power enable signal according to the second power supply signal; when the received second power good signal is enabled, the second control unit enables and outputs the second power control signal respectively to control the second switch unit so that the output of the second switch unit is connected to the output of the second voltage generator connected to the second switch unit; and when the received second power supply signal is enabled and the second power good signal is disabled, the second control unit disables and outputs the second power control signal respectively to control the second switch unit so that the output of the second switch unit is connected to the output of the first voltage generator connected to the second switch unit.

Based on the above, in the power redundant system provided by the present invention, the first voltage generator and the second voltage generator with the same voltage are used. When the power good signal is enabled, the control unit enables the power control signal to control the switch unit so that the output of the switch unit is connected to the output of the second voltage generator. When the power supply signal is enabled and the power good signal is disabled, the control unit disables the power control signal to control the switch unit, so that the output of the switch unit is connected to the output of the first voltage generator. Therefore, the power redundant system can select the redundant power, and the voltage generators in the power redundant system can backup each other.

In order to make the features and advantages of the present invention clearer and more comprehensible, the present invention is described in detail below with reference to embodiments and the accompanying drawings.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
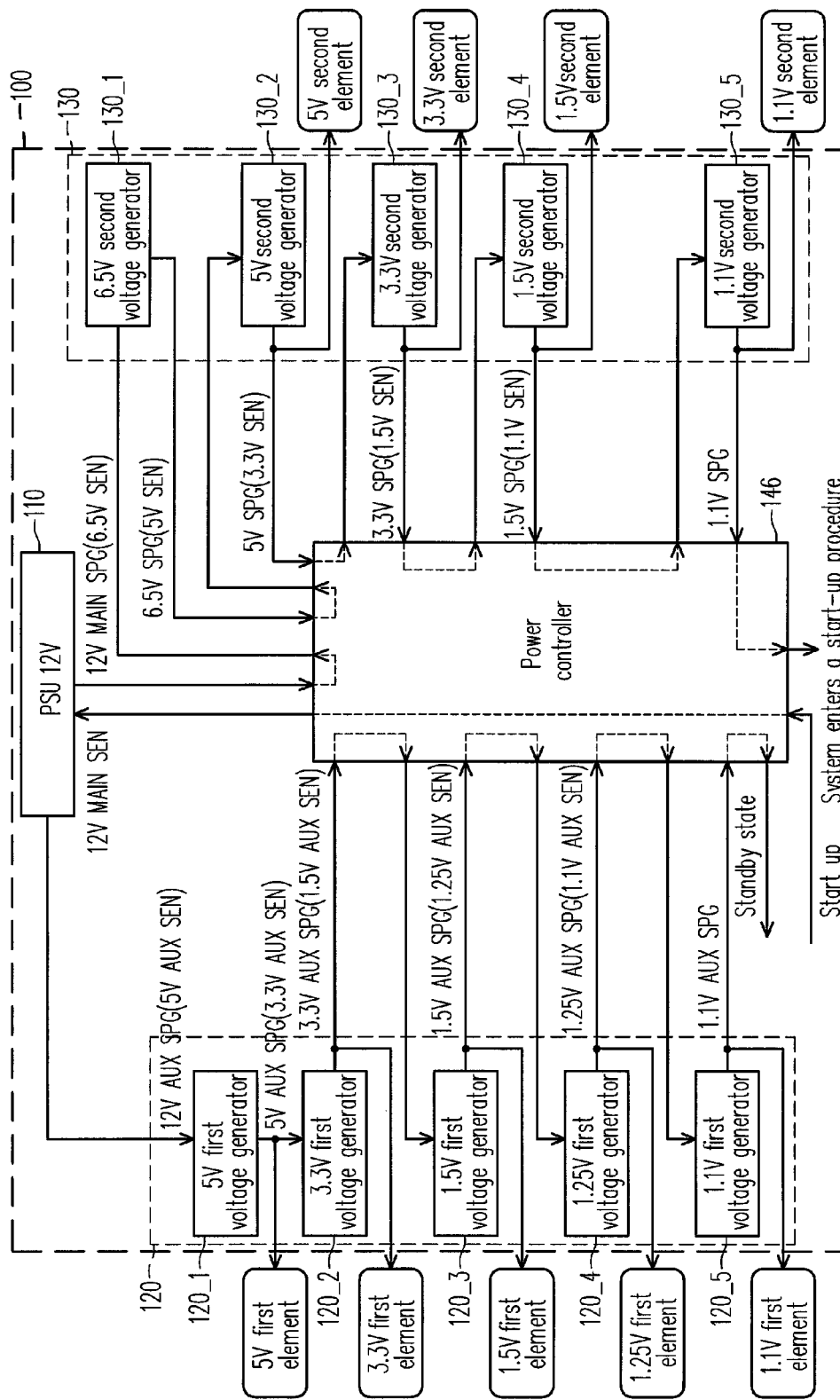
FIG. 1 is a schematic block diagram of a conventional computer power supply system.

Reference will now be made in detail to the present embodiments of the invention, examples of which are illustrated in the accompanying drawings. Wherever possible, the same reference numbers are used in the drawings and the description to refer to the same or like parts.

Figure 2:
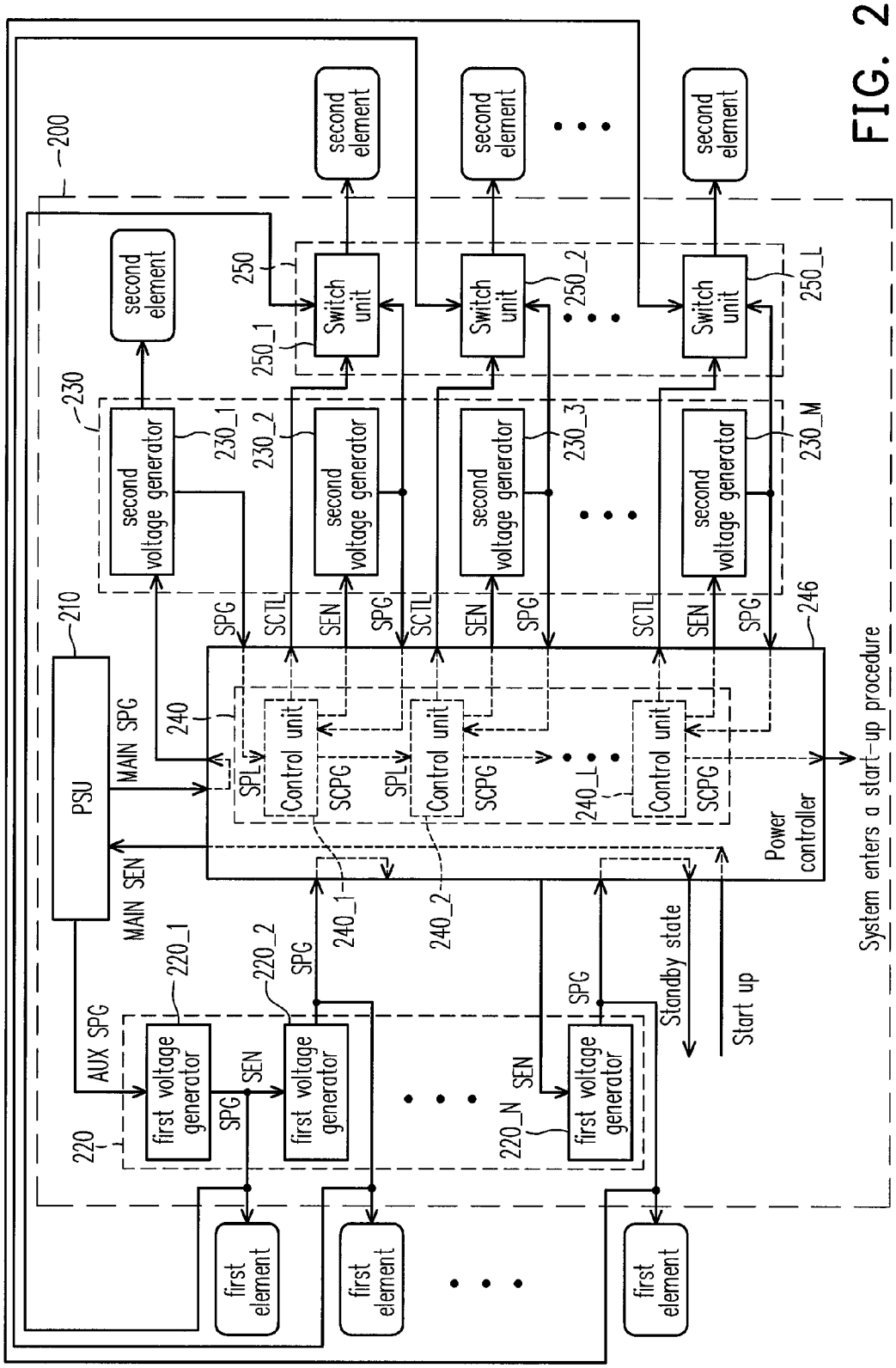
FIG. 2 is a schematic block diagram of a power redundant system according to an embodiment of the present invention.

FIG. 2 is a schematic block diagram of a power redundant system 200 according to an embodiment of the present invention. Referring to FIG. 2, the power redundant system 200 includes a PSU 210, N first voltage generators 220, M second voltage generators 230, a control unit 240 and a switch unit 250. The power redundant system 200 may be applied to a notebook computer, a personal computer, a work station, an embedded system, and so on. The present invention is not limited thereto. The power redundant system 200 may also be another type of device including a power redundant scheme. The N first voltage generators 220 provide N different voltages, and the M second voltage generators 230 provide M different voltages, where N and M are positive integers greater than 1 and vary according the design of a computer system and requirements of a customer. The foregoing description is not intended to limit this disclosure, and the system may also include other voltage generators generating the same voltages.

In this embodiment, totally, voltages of L first voltage generators 220 and voltages of L second voltage generators 230 are the same respectively, which indicates the following: a voltage of the i-th first voltage generator is the same as that of the j-th second voltage generator, a voltage of the (i+1)-th first voltage generator is the same as that of the (j+1)-th second voltage generator, . . . , and a voltage of the (i+L−1)-th first voltage generator is the same as that of the (j+L−1)-th second voltage generator, where L is a positive integer greater than 1, i is a natural number and is less than or equal to N, j is a natural number and is less than or equal to M, and L is less than or equal to N and M. Referring to the embodiment of FIG. 2, i=1 and j=2, so the i-th first voltage generator is the 1-st first voltage generator 220_1, and the j-th second voltage generator is the 2-nd second voltage generator 230_2, which is not intended to limit this disclosure.

The first switch unit is coupled to the i-th first voltage generator and the j-th second voltage generator, the second switch unit is coupled to the (i+1)-th first voltage generator and the (j+1)-th second voltage generator, . . . , the L-th switch unit is coupled to the (i+L−1)-th first voltage generator and the (j+L−1)-th second voltage generator. For example, in the embodiment of FIG. 2, the first switch unit 250_1 is coupled to the 1-st first voltage generator 220_1 and the 2-nd second voltage generator 230_2, which is not intended to limit this disclosure. The first control unit is coupled to the first switch unit and the j-th second voltage generator, the second control unit is coupled to the second switch unit and the (j+1)-th second voltage generator, . . . , the L-th control unit is coupled to the L-th switch unit and the (j+L−1)-th second voltage generator. For example, in this embodiment, the first control unit 240_1 is coupled to the first switch unit 250_1 and the 2-nd second voltage generator 230_2, which is not intended to limit this disclosure.

In this embodiment, the first switch unit 250_1 receives a power control signal SCTL to select one of the two outputs of the 1-st first voltage generator 220_1 and the 2-nd second voltage generator 230_2 to be connected to an output of the first switch unit 250_1, and so on. In other words, each of the switch units 250 receives a power control signal SCTL to select one of the two outputs of the first voltage generator 220 and the second voltage generator 230 coupled to the switch unit 250 to be connected to an output of the switch unit 250.

In this embodiment, the control unit 240 is disposed in a power controller 246 and may be a programmable chip. The programmable chip may be a complex programmable logic device (CPLD), a programmable interrupt controller (PIC) or a field programmable gate array (FPGA), and used to implement operations and combinational logic of the computer system.

When the system is not booted up, the PSU 210 provides an auxiliary power good signal AUX SPG with a small current to the 1-st first voltage generator 220_1 with a large voltage value. When the 1-st first voltage generator 220_1 normally supplies an auxiliary voltage, the 1-st first voltage generator 220_1 sends a power good signal SPG. The 2-nd first voltage generator 220_2 receives the signal as a power enable signal SEN for the 2-nd first voltage generator 220_2. In this turn, the N-th first voltage generator 220_N with a smaller voltage value is started up finally The system is in a shutdown or standby state, and the computer system is not formally booted up until the power key is turned on or a firmware interface is started. At this time, the power controller 246 transmits a main power enable signal MAIN SEN to the PSU 210. When the PSU 210 supplies a voltage capable of providing a large current to the second voltage generator 230, the PSU 210 also sends a main power good signal MAIN SPG.

After receiving the main power good signal MAIN SPG, the power controller 246 sends the power enable signal SEN to the 1-st second voltage generator 230_1. At this time, the 1-st second voltage generator 230_1 operates and supplies a voltage. When the 1-st second voltage generator 230_1 normally supplies the voltage, the 1-st second voltage generator 230_1 sends the power good signal SPG. When the 2-nd second voltage generator 230_2 receives the power enable signal SEN, the 2-nd second voltage generator 230_2 operates and supplies a voltage. When the 2-nd second voltage generator 230_2 normally supplies the voltage, the 2-nd second voltage generator 230_2 sends the power good signal SPG. In this turn, finally, the M-th second voltage generator 230_M normally supplies a voltage and sends the power good signal SPG. In sum, when the second voltage generator 230 receives the power enable signal SEN, the second voltage generator 230 operates and supplies the voltage, and when normally supplying the voltage, the second voltage generator 230 outputs the power good signal SPG.

In this embodiment, the power controller 246 generates a power supply signal SPL for the first control unit 240_1 according to the power good signal SPG sent by the 1-st second voltage generator 230_1. The first control unit 240_1 receives the power supply signal SPL and generates the power enable signal SEN for the 2-nd second voltage generator 230_2 according to the power supply signal SPL. As stated above, after the 2-nd second voltage generator 230_2 receives the power enable signal SEN, the 2-nd second voltage generator 230_2 normally supplies the voltage and sends the enabled power good signal SPG. When the power good signal SPG received by the first control unit 240_1 is enabled, the first control unit 240_1 enables and outputs the power control signal SCTL to control the first switch unit 250_1 so that the output of the first switch unit 250_1 is connected to an output of the 2-nd second voltage generator 230_2, and the first control unit 240_1 enables a control good signal SCPG and outputs the control good signal SCPG to the second control unit 240_2.

The second control unit 240_2 receives the control good signal SCPG as the power supply signal SPL thereof, so as to generate the power enable signal SEN for the 3-rd second voltage generator 230_3. As stated above, after the 3-rd second voltage generator 230_3 receives the power enable signal SEN, the 3-rd second voltage generator 230_3 normally supplies the voltage and sends the power good signal SPG. When the power good signal SPG received by the second control unit 240_2 is enabled, the second control unit 240_2 enables and outputs the power control signal SCTL to control the second switch unit 250_2, so that an output of the second switch unit 250_2 is connected to an output of the 3-rd second voltage generator 230_3, and the second control unit 240_2 enables the control good signal SCPG and outputs the control good signal SCPG to the third control unit 240_3. The rest may be deduced by analogy, finally the L-th second voltage generator 230_L with a small voltage value normally supplies power, and the L-th control unit 240_L enables and outputs the control good signal SCPG so that the system enters a start-up procedure.

In sum, the control unit 240 receives the power supply signal SPL, and generates the power enable signal SEN according to the power supply signal SPL. When the received power enable signal SEN is enabled, the control unit 240 enables and outputs the power control signal SCTL to control the switch unit 250, so that the output of the switch unit 250 is connected to the output of the second voltage generator 230 connected to the switch unit 250.

When any one of main voltage generators in the system is faulty so that a supply voltage in the system is faulty, for example, when the 2-nd second voltage generator 230_2 is faulty and cannot supply the voltage normally, the 2-nd second voltage generator 230_2 sends a disabled power good signal SPG. At this time, the power supply signal SPL received by the first control unit 240_1 is enabled and the power good signal SPG is disabled. The first control unit 240_1 disables and outputs the power control signal SCTL to control the first switch unit 250_1, so that the output of the first switch unit 250_1 is connected to an output of the 1-st first voltage generator 220_1. Similarly, processing actions performed when other second voltage generators 230 are faulty can be analogized. In sum, when the power supply signal SPL received by the control unit 240 is enabled and the power enable signal SEN is disabled, the control unit 240 disables and outputs the power control signal SCTL to control the switch unit 250, so that the output of the switch unit 250 is connected to the output of the first voltage generator 220 connected to the switch unit 250. Therefore, when the second voltage generator 230 is faulty, the output of the switch unit 250 is connected to the first voltage generator 220 capable of normally supplying the power instead of the faulty second voltage generator 230, so the first voltage generator and the second voltage generator can backup each other.

Based on the above, when the power supply signal SPL received by the first control unit 240_1 is enabled and the power good signal SPG is disabled, and after the output of the first switch unit 250_1 is connected to the output of the 1-st first voltage generator 220_1, the first control unit 240_1 must reset the 2-nd second voltage generator 230_2 through the power enable signal SEN. For example, the power enable signal SEN is first disabled for a while and then enabled, or a few continuous impulses are sent on the power enable signal SEN, so as to reset the 2-nd second voltage generator 230_2. After the 2-nd second voltage generator 230_2 is reset, and when the 2-nd second voltage generator 230_2 supplies the power normally and the power good signal SPG thereof is enabled, the first control unit 240_1 enables the power control signal SCTL again to control the first switch unit 250_1 so that the output of the first switch unit 250_1 is connected to the output of the 2-nd second voltage generator 230_2. In other words, when the power supply signal SPL received by the control unit 240 is enabled and the power enable signal SEN is disabled, the control unit 240 must reset the second voltage generator 230 coupled thereto through the output power enable signal SEN thereof. After the second voltage generator 230 is reset, and when the power supply signal SPL received by the control unit 240 is enabled, the control unit 240 enables and outputs the power control signal SCTL to control the switch unit 250, so that the output of the switch unit 250 is connected to the output of the second voltage generator 230 connected to the switch unit 250. The scheme makes the resetting of the system possible, further improving the stability of the system.

In this embodiment, the first control unit 240_1 is further disposed with a counter (not shown). When the power supply signal SPL is enabled and the power good signal SPG is disabled, the counter is set to zero and begins to count the number of times of reset of the 2-nd second voltage generator 230_2. When the counted number of times does not reach a preset value (the preset value may be set by research and development personnel according to the design of the system) and the power good signal SPG is still disabled, indicating that the reset 2-nd second voltage generator 230_2 still cannot supply the power normally after being reset, the system continues resetting the 2-nd second voltage generator 230_2. When the counted number of times exceeds the preset value, indicating that the 2-nd second voltage generator 230_2 still cannot return to normal after being reset many times, the first control unit 240_1 enables and outputs the power control signal SCTL again so that the output of the first switch unit 250_1 is connected to the output of the 2-nd second voltage generator 230_2, so that voltage control timing of the system is faulty. At this time, it is determined that the 2-nd second voltage generator 230_2 of the system is faulty, the supply voltage in the system is faulty, and the system breaks down. Generally speaking, the control unit 240 is disposed with the counter. When the power supply signal SPL received by the control unit 240 is enabled and the power good signal SPG is disabled, the counter is set to zero and begins to count the number of times of the reset of the second voltage generator 230 coupled to the control unit 240. When the counted number does not reach the preset value and the power good signal SPG is still disabled, the resetting of the second voltage generator 230 continues.

In this embodiment, the first control unit 240_1 is alternatively further disposed with a timer (not shown). When the power supply signal SPL is enabled and the power good signal SPG is disabled, the timer is set to zero. When the 2-nd second voltage generator 230_2 coupled to the first control unit 240_1 is reset, the times begins to count time. When the counted time does not reach a preset time (the preset time may be set by research and development personnel according to the design of the system) and the power good signal SPG is still disabled, indicating the reset 2-nd second voltage generator 230_2 still cannot supply the power normally after being reset, the system continues resetting the 2-nd second voltage generator 230_2. When the counted time exceeds the preset time, indicating that the 2-nd second voltage generator 230_2 still cannot return to normal after being reset many times, the first control unit 240_1 enables and outputs the power control signal SCTL again so that the output of the first switch unit 250_1 is connected to the output of the 2-nd second voltage generator 230_2, so that voltage control timing of the system is faulty. At this time, it is determined that the 2-nd second voltage generator 230_2 of the system is faulty, the supply voltage in the system is faulty, and the system breaks down. Generally speaking, the control unit 240 is disposed with the timer. When the power supply signal SPL received by the control unit 240 is enabled and the power good signal SPG is disabled, the timer is set to zero. When the second voltage generator 230 coupled to the control unit 240 is reset, the timer begins to count time. When the counted time does not reach the preset time and the power good signal SPG is still disabled, the resetting of the second voltage generator 230 continues.

It can be known from this that, the control unit 240 outputs the power control signal SCTL to the switch unit 250 coupled to the control unit 240 according to a relationship between the power supply signal SPL and the power good signal SPG, and one of the two outputs of the first voltage generator 220 and the second voltage generator 230 is connected to the output of the switch unit 250 according to the power control signal SCTL received by the switch unit 250. Therefore, when any one of the voltage generators in the power supply system is faulty, the system can automatically switch to the redundant power, thereby solving the problem that the system breaks down.

In this embodiment, the voltages of L first voltage generators 220 and the voltages of L second voltage generators 230 are the same respectively, which is not intended to limit this disclosure. The protection scope of this disclosure may also include that a voltage of only one single first voltage generator 220 is the same as that of only one single second voltage generator 230. For example, only the voltage of the i-th first voltage generator 220 is the same as that of the j-th second voltage generator 230. In this example, only one single control unit 240 and one single switch unit 250 are required. According to the foregoing operation principle, the efficacy of the redundant power is still included.

Figure 3:
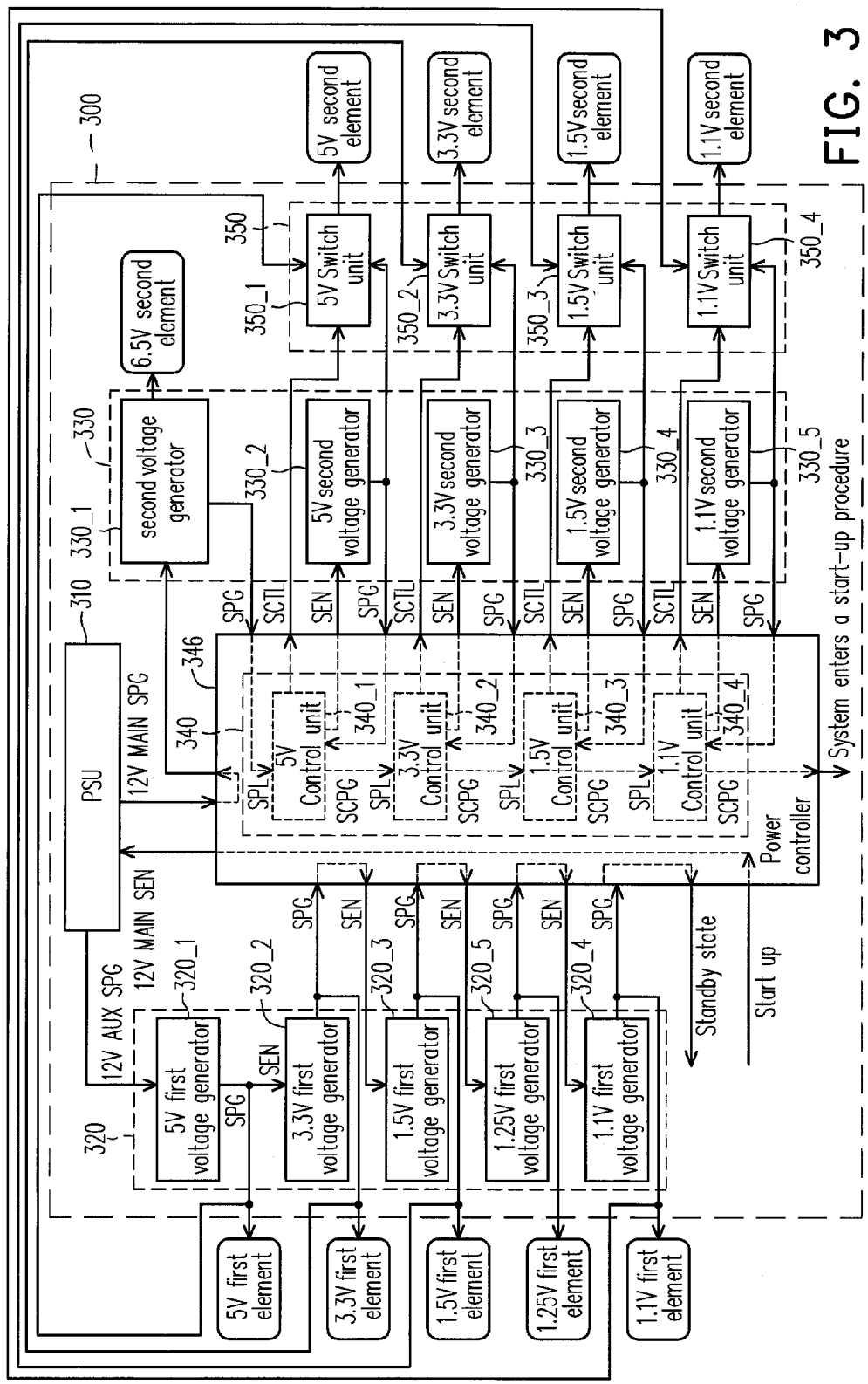
FIG. 3 is a schematic block diagram of a power redundant system according to another embodiment of the present invention.

FIG. 3 is a schematic block diagram of a power redundant system 300 according to another embodiment of the present invention. Referring to FIG. 3, in the actual application embodiment, M=5, N=5, L=4, i=1, and j=2. More clearly speaking, the power redundant system 300 includes five first voltage generators 320, five second voltage generators 330, four control units 340, and four switch units 350. In the system, a main power and an AUX power backup each other. In the system, when the second voltage generator 330 is faulty, the switch unit 350 connects an output of the first voltage generator 320 to an output of the switch unit 350 according to a power control signal SCTL received by the switch unit 350, and the control unit 340 controls the second voltage generator 330 to be reset. At this time, the system still continues normal operation. Meanwhile, the timer in the control unit 340 is started up to count time of the resetting of the second voltage generator 330.

If the second voltage generator 330 in the system succeeds in resetting and returns to normal functions, the control unit 340 controls the switch unit 350 through the power control signal SCTL so that the supply voltage is switched to be generated by the normal voltage generator. If the second voltage generator 330 still cannot work normally after being reset, the counted time after resetting is compared with a preset time. If the preset time is reached, at this time, it is determined that the second voltage generator 330 in the system is faulty, the supply voltage in the system is faulty, and the system breaks down. Subsequent processing of a system error scheme is performed. If the preset time is not reached and the power good signal SPG is still disabled, the resetting of the second voltage generator 330 continues.

Figure 4:
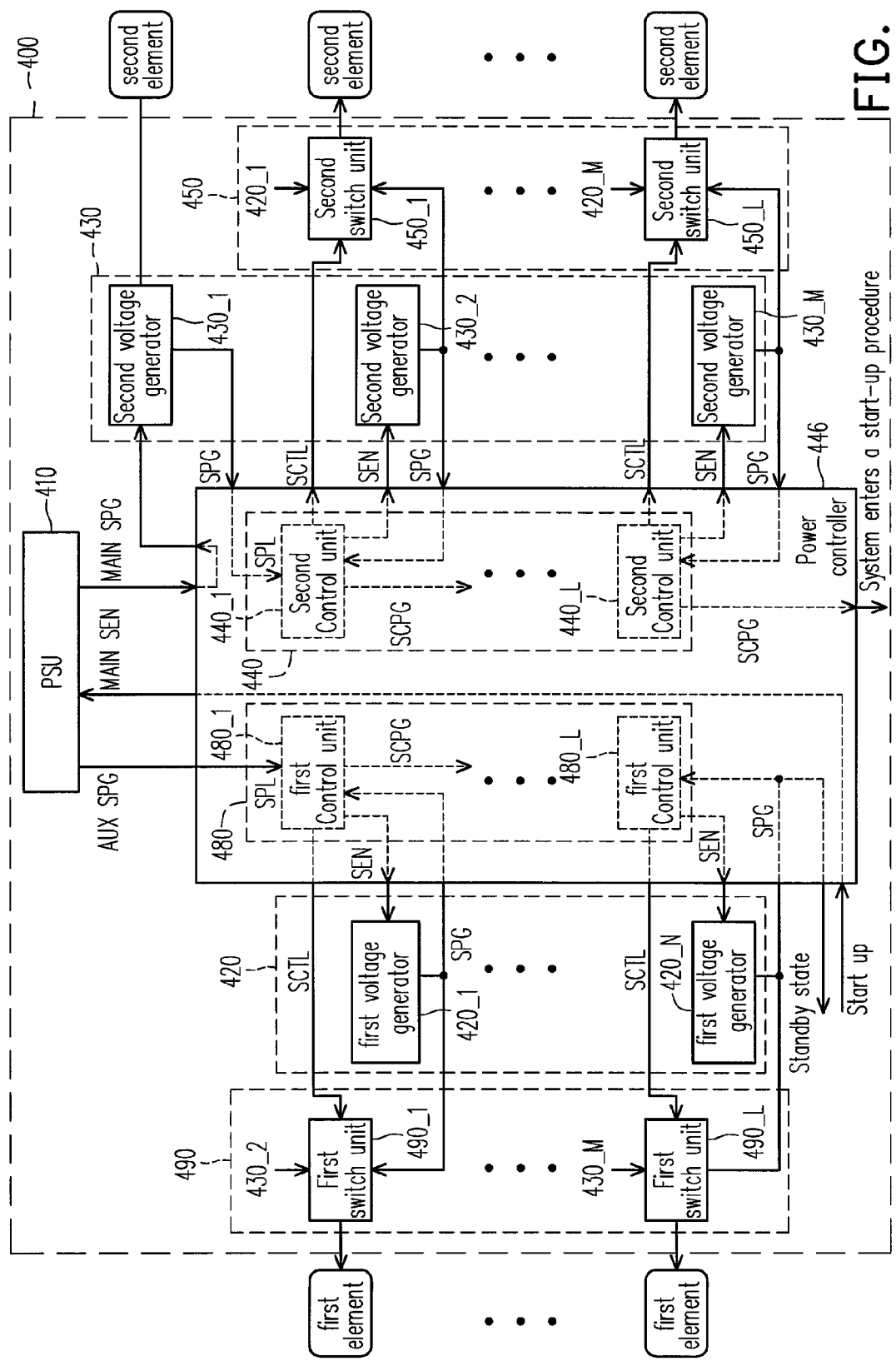
FIG. 4 is a schematic block diagram of a power redundant system according to still another embodiment of the present invention.

FIG. 4 is a schematic block diagram of a power redundant system 400 according to still another embodiment of the present invention. Referring to FIG. 2 and FIG. 4, the power redundant system 400 and the power redundant system 200 differ in that, L first control units 480 and first switch units 490 exist in the power redundant system 400.

In this embodiment, similar to the first embodiment, voltages of L first voltage generators 420 and voltages of L second voltage generators 430 are the same respectively, which indicates the following: a voltage of the i-th first voltage generator is the same as that of the j-th second voltage generator, a voltage of the (i+1)-th first voltage generator is the same as that of the (j+1)-th second voltage generator, . . . , and a voltage of the (i+L−1)-th first voltage generator is the same as that of the (j+L−1)-th second voltage generator, where L is a positive integer greater than 1, i is a natural number and is less than or equal to N, j is a natural number and is less than or equal to M, and L is less than or equal to N and M. Here, i=1 and j=2, so the i-th first voltage generator is the 1-st first voltage generator 220_1, and the j-th second voltage generator is the 2-nd second voltage generator 230_2, which is not intended to limit this disclosure.

Referring to FIG. 4, the 1-st first switch unit is coupled to the i-th first voltage generator and the j-th second voltage generator, the 2-nd first switch unit is coupled to the (i+1)-th first voltage generator and the (j+1)-th second voltage generator, . . . , the L-th first switch unit is coupled to the (i+L−1)-th first voltage generator and the (j+L−1)-th second voltage generator. For example, in this embodiment, the 1-st first switch unit 490_1 is coupled to the 1-st first voltage generator 420_1 and the 2-nd second voltage generator 430_2, which is not intended to limit this disclosure.

In this embodiment, the 1-st first control unit is coupled to the 1-st first switch unit and the i-th first voltage generator, the 2-nd first control unit is coupled to the 2-nd first switch unit and the (i+1)-th first voltage generator, . . . , the L-th first control unit is coupled to the L-th first switch unit and the (i+L−1)-th first voltage generator. For example, in this embodiment, the 1-st first control unit 480_1 is coupled to the 1-st first switch unit 490_1 and the 1-st first voltage generator 420_1.

In this embodiment, the first switch unit 490 receives the first power control signal SCTL to select one of two outputs of the first voltage generator 420 and the second voltage generator 430 coupled to the first switch unit 490 to be connected to an output of the first switch unit 490.

A resetting relationship and a counter application of the first control unit 480 and the first switch unit 490 are substantially similar to or the same as those of the second control unit 440 and the second switch unit 450, so details will not be described here again.

Based on the above, the first control unit 480 outputs the power control signal SCTL to the first switch unit 490 coupled to the first control unit 480 according to a relationship between a power supply signal SPL and a power good signal SPG received by the first control unit 480, and the first switch unit 490 connects one of the two outputs of the first voltage generator 420 and the second voltage generator 430 to the output of the switch unit 490 according to the power control signal SCTL received by the first switch unit 490. Therefore, after the system enters the operating system, when any one of the first voltage generator 420 and the second voltage generator 430 is faulty in the power supply system, the system can provide a redundant power, thereby solving the problem that the system breaks down, and achieving the objective that the first voltage generator 420 and the second voltage generator 430 backup each other.

However, the embodiments are only intended to illustrate the concept of the present invention rather than limit the actual application manners of the present invention.

In conclusion, in the first embodiment of the power redundant system of the present invention, the first voltage generator 220 and the second voltage generator 230 with the same voltage are used. When the power good signal SPG is enabled, the control unit 240 enables the power control signal SCTL to control the switch unit 250 so that the output of the switch unit 250 is connected to the output of the second voltage generator 230. When the power supply signal SPL is enabled and the power good signal SPG is disabled, the control unit 240 disables the power control signal SCTL to control the switch unit 250, so that the output of the switch unit 250 is connected to the output of the first voltage generator 220. In the second embodiment of the present invention, a plurality of voltage generators is included. When any one of the voltage generators in the power supply system is faulty, the redundant power can be provide between the voltage generators. Moreover, in the third embodiment of the present invention, a plurality of first control units 480 and first switch units 490 is included. After the system enters the operating system, and when any one of the first voltage generator 420 and the second voltage generator 430 is faulty in the power supply system, the objective that the first voltage generator 420 and the second voltage generator 430 backup each other is achieved.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A power redundant system, comprising:
   N first voltage generators, for providing N different voltages;
   M second voltage generators, for providing M different voltages, wherein a voltage of the i-th first voltage generator is the same as that of the j-th second voltage generator, the j-th second voltage generator operates and supplies the voltage when the j-th second voltage generator receives a power enable signal, the j-th second voltage generator outputs a power good signal when supplying the voltage normally, N and M are positive integers greater than 1, i is a natural number and is less than or equal to N, and j is a natural number and is less than or equal to M;
   a switch unit, coupled to the i-th first voltage generator and the j-th second voltage generator, and for receiving a power control signal, to select one of two outputs of the i-th first voltage generator and the j-th second voltage generator to be connected to an output of the switch unit; and
   a control unit, coupled to the switch unit and the j-th second voltage generator, wherein the control unit generates a power enable signal according to a power supply signal, when the power good signal is enabled, the control unit enables the power control signal to control the switch unit so that the output of the switch unit is connected to the output of the j-th second voltage generator, and when the power supply signal is enabled and the power good signal is disabled, the control unit disables the power control signal to control the switch unit so that the output of the switch unit is connected to the output of the i-th first voltage generator.

2. The power redundant system according to claim 1, wherein when the power supply signal is enabled and the power good signal is disabled, the control unit resets the j-th second voltage generator through the power enable signal.

3. The power redundant system according to claim 2, wherein after the j-th second voltage generator is reset, and when the power good signal is enabled, the control unit enables the power control signal to control the switch unit so that the output of the switch unit is connected to the output of the j-th second voltage generator.

4. The power redundant system according to claim 2, wherein the control unit further comprises a counter; when the power supply signal is enabled and the power good signal is disabled, the counter is set to zero and begins to count the number of times of resetting of the second voltage generator; and when the counted number does not reach a preset value and the power good signal is still disabled, the j-th second voltage generator is continuously reset.

5. The power redundant system according to claim 2, wherein the control unit further comprises a timer; when the power supply signal is enabled and the power good signal is disabled, the timer is set to zero; when the j-th second voltage generator is reset, the timer begins to count time; and when the counted time does not reach a preset time and the power good signal is still disabled, the j-th second voltage generator is continuously reset.

6. The power redundant system according to claim 1, wherein the control unit is disposed in a programmable chip, and the programmable chip is a complex programmable logic device (CPLD), a programmable interrupt controller (PIC) or a field programmable gate array (FPGA).

7. A power redundant system, comprising:
   N first voltage generators, for providing N different voltages;
   M second voltage generators, for providing M different voltages, wherein voltages of L first voltage generators are the same as those of L second voltage generators, a voltage of the i-th first voltage generator is the same as that of the j-th second voltage generator, a voltage of the (i+1)-th first voltage generator is the same as that of the (j+1)-th second voltage generator, . . . , and a voltage of the (i+L−1)-th first voltage generator is the same as that of the (j+L−1)-th second voltage generator; when each of the second voltage generators with the same voltage receives a power enable signal, the second voltage generators operate and supply the voltage; the second voltage generators each output a power good signal when supplying the voltage normally; N, M and L are positive integers greater than 1, i is a natural number and is less than or equal to N, j is a natural number and is less than or equal to M, and L is less than or equal to N and M;
   L switch units, wherein the first switch unit is coupled to the i-th first voltage generator and the j-th second voltage generator, the second switch unit is coupled to the (i+1)-th first voltage generator and the (j+1)-th second voltage generator, . . . , the L-th switch unit is coupled to the (i+L−1)-th first voltage generator and the (j+L−1)-th second voltage generator; each of the switch units is used for receiving a power control signal to select one of two outputs of the coupled first voltage generator and the coupled second voltage generator thereof to be connected to an output of each of the switch units respectively; and
   L control units, wherein the first control unit is coupled to the first switch unit and the j-th second voltage generator, the second control unit is coupled to the second switch unit and the (j+1)-th second voltage generator, . . . , the L-th control unit is coupled to the L-th switch unit and the (j+L−1)-th second voltage generator; each of the control units receives a power supply signal to generate the power enable signal; when the received power good signal is enabled, the control unit enables and outputs the power control signal respectively to control the switch unit so that the output of the switch unit is connected to the output of the second voltage generator connected to the switch unit; and when the received power supply signal is enabled and the power good signal is disabled, the control unit disables and outputs the power control signal respectively to control the switch unit so that the output of the switch unit is connected to the output of the first voltage generator connected to the switch unit.

8. The power redundant system according to claim 7, wherein when the power supply signal received by the control unit is enabled and the power good signal is disabled, the control unit resets the coupled second voltage generator thereof through the output power enable signal thereof.

9. The power redundant system according to claim 8, wherein after the second voltage generator is reset, and when the power good signal received by the control unit is enabled, the control unit enables and outputs the power control signal to control the switch unit so that the output of the switch unit is connected to the output of the second voltage generator connected to the switch unit.

10. The power redundant system according to claim 8, wherein the control unit further comprises a counter; when the power supply signal received by the control unit is enabled and the power good signal is disabled, the counter is set to zero and begins to count the number of times of resetting of the second voltage generator coupled to the control unit; and when the counted number does not reach a preset value and the power good signal is still disabled, the second voltage generator is continuously reset.

11. The power redundant system according to claim 8, wherein the control unit further comprises a timer; when the power supply signal received by the control unit is enabled and the power good signal is disabled, the timer is set to zero; when the second voltage generator coupled to the control unit is reset, the timer begins to count time; and when the counted time does not reach a preset time and the power good signal is still disabled, the second voltage generator is continuously reset.

12. The power redundant system according to claim 7, wherein the control unit is disposed in a programmable chip, and the programmable chip is a complex programmable logic device (CPLD), a programmable interrupt controller (PIC) or a field programmable gate array (FPGA).

13. A power redundant system, comprising:
N first voltage generators, for providing N different voltages;
M second voltage generators, for providing M different voltages, wherein voltages of L first voltage generators are the same as those of L second voltage generators, a voltage of the i-th first voltage generator is the same as that of the j-th second voltage generator, a voltage of the (i+1)-th first voltage generator is the same as that of the (j+1)-th second voltage generator, . . . , and a voltage of the (i+L−1)-th first voltage generator is the same as that of the (j+L−1)-th second voltage generator; when each of the first voltage generators with the same voltage receives a first power enable signal, the first voltage generators operate and supply the voltage, the first voltage generators each output a first power good signal when supplying the voltage normally; when each of the second voltage generators with the same voltage receives a second power enable signal, the second voltage generators operate and supply the voltage, the second voltage generators each output a second power good signal when supplying the voltage normally; N, M and L are positive integers greater than 1, i is a natural number and is less than or equal to N, j is a natural number and is less than or equal to M, and L is less than or equal to N and M;
L first switch units, wherein the 1-st first switch unit is coupled to the i-th first voltage generator and the j-th second voltage generator, the 2-nd first switch unit is coupled to the (i+1)-th first voltage generator and the (j+1)-th second voltage generator, . . . , the L-th first switch unit is coupled to the (i+L−1)-th first voltage generator and the (j+L−1)-th second voltage generator; each of the first switch units is used for receiving a first power control signal to select one of two outputs of the coupled first voltage generator and the coupled second voltage generator thereof to be connected to an output of each of the first switch units respectively;
L first control units, wherein the 1-st first control unit is coupled to the 1-st first switch unit and the i-th first voltage generator, the 2-nd first control unit is coupled to the 2-nd first switch unit and the (i+1)-th first voltage generator, . . . , the L-th first control unit is coupled to the L-th first switch unit and the (i+L−1)-th first voltage generator; each of the first control units receives a first power supply signal to generate the first power enable signal according to the first power supply signal; when the received first power good signal is enabled, the first control unit enables and outputs the first power control signal receptively to control the first switch unit so that the output of the first switch unit is connected to the output of the first voltage generator connected to the first switch unit; and when the received first power supply signal is enabled and the first power good signal is disabled, the first control unit disables and outputs the first power control signal respectively to control the first switch unit so that the output of the first switch unit is connected to the output of the second voltage generator connected to the first switch unit;
L second switch units, wherein the 1-st second switch unit is coupled to the i-th first voltage generator and the j-th second voltage generator, the 2-nd second switch unit is coupled to the (i+1)-th first voltage generator and the (j+1)-th second voltage generator, . . . , the L-th second switch unit is coupled to the (i+L−1)-th first voltage generator and the (j+L−1)-th second voltage generator; each of the second switch units is used for receiving a second power control signal to select one of two outputs of the coupled first voltage generator and the coupled second voltage generator thereof to be connected to an output of each of the second switch units respectively; and
L second control units, wherein the 1-st second control unit is coupled to the 1-st second switch unit and the j-th second voltage generator, the 2-nd second control unit is coupled to the 2-nd second switch unit and the (j+1)-th second voltage generator, . . . , the L-th second control unit is coupled to the L-th second switch unit and the (j+L−1)-th second voltage generator; each of the second control units receives a second power supply signal to generate the second power enable signal according to the second power supply signal; when the received second power good signal is enabled, the second control unit enables and outputs the second power control signal respectively to control the second switch unit so that the output of the second switch unit is connected to the output of the second voltage generator connected to the second switch unit; and when the received second power supply signal is enabled and the second power good signal is disabled, the second control unit disables and outputs the second power control signal respectively to control the second switch unit so that the output of the second switch unit is connected to the output of the first voltage generator connected to the second switch unit.

14. The power redundant system according to claim 13, wherein when the first power supply signal received by the first control unit is enabled and the first power good signal is disabled, the first control unit resets the coupled first voltage generator thereof through the output first power enable signal thereof; and when the second power supply signal received by the second control unit is enabled and the second power good signal is disabled, the second control unit resets the coupled second voltage generator thereof through the output second power enable signal thereof.

15. The power redundant system according to claim 14, wherein after the first voltage generator is reset, and when the first power good signal received by the first control unit is enabled, the first control unit enables and outputs the first power control signal to control the first switch unit so that the output of the first switch unit is connected to the output of the first voltage generator connected to the first switch unit; and after the second voltage generator is reset, and when the second power good signal received by the second control unit is enabled, the second control unit enables and outputs the second power control signal to control the second switch unit so that the output of the second switch unit is connected to the output of the second voltage generator connected to the second switch unit.

16. The power redundant system according to claim 14, wherein the first control unit further comprises a first counter; when the first power supply signal received by the first control unit is enabled and the first power good signal is disabled, the first counter is set to zero and begins to count the number of times of resetting of the first voltage generator coupled to the first control unit, and when the counted number does not reach a first preset value and the first power good signal is still disabled, the first voltage generator is continuously reset; and the second control unit further comprises a second counter; when the second power supply signal received by the second control unit is enabled and the second power good signal is disabled, the second counter is set to zero and begins to count the number of times of resetting of the second voltage generator coupled to the second control unit, and when the counted number does not reach a second preset value and the second power good signal is still disabled, the second voltage generator is continuously reset.

17. The power redundant system according to claim 14, wherein the first control unit further comprises a first timer; when the first power supply signal received by the first control unit is enabled and the first power good signal is disabled, the first timer is set to zero; when the first voltage generator coupled to the first control unit is reset, the first timer begins to count time; and when the counted time does not reach a first preset time and the first power good signal is still disabled, the first voltage generator is continuously reset; and the second control unit further comprises a second timer; when the second power supply signal received by the second control unit is enabled and the second power good signal is disabled, the second timer is set to zero; when the second voltage generator coupled to the second control unit is reset, the second timer begins to count time; and when the counted time does not reach a second preset time and the second power good signal is still disabled, the second voltage generator is continuously reset.

18. The power redundant system according to claim 13, wherein the first control unit and the second control unit are disposed in a programmable chip, and the programmable chip is a complex programmable logic device (CPLD), a programmable interrupt controller (PIC) or a field programmable gate array (FPGA).

* * * * *